United States Patent [19]
Sugano

[11] Patent Number: 4,939,955
[45] Date of Patent: Jul. 10, 1990

[54] PLANETARY GEARING FOR AUTOMATIC TRANSMISSION

[75] Inventor: Kazuhiko Sugano, Yokohama, Japan

[73] Assignee: Nissan Motor Co., Ltd., Yokohama, Japan

[21] Appl. No.: 225,189

[22] Filed: Jul. 28, 1988

[30] Foreign Application Priority Data

Jul. 28, 1987 [JP] Japan ................................ 62-186752

[51] Int. Cl.$^5$ .............................................. F16H 57/10
[52] U.S. Cl. ..................................... 475/278; 475/285
[58] Field of Search ................ 74/740, 751, 762, 763, 74/766, 767, 770, 768, 769, 781 R

[56] References Cited

U.S. PATENT DOCUMENTS

| | | | |
|---|---|---|---|
| 2,454,014 | 11/1948 | Seybold | 74/766 X |
| 3,941,013 | 3/1976 | Miller | 74/740 |
| 3,971,268 | 7/1976 | Murakami et al. | 74/769 X |
| 4,038,887 | 8/1977 | Murakami et al. | 74/763 X |
| 4,228,697 | 10/1980 | Miller | 74/762 X |
| 4,233,861 | 11/1980 | Gaus et al. | 74/763 |
| 4,417,484 | 11/1983 | Gaus et al. | 74/766 X |
| 4,653,348 | 3/1987 | Hiraiwa | 74/763 X |
| 4,660,439 | 4/1987 | Hiraiwa | 73/762 X |
| 4,711,138 | 12/1987 | Miura et al. | 74/767 X |
| 4,744,267 | 5/1988 | Lepelletier | 74/740 X |
| 4,817,462 | 4/1989 | Dach et al. | 74/740 |

FOREIGN PATENT DOCUMENTS

| | | | |
|---|---|---|---|
| 1505723 | 7/1970 | Fed. Rep. of Germany | 74/763 |
| 2813223 | 9/1979 | Fed. Rep. of Germany | |
| WO85/05666 | 12/1985 | Int'l Pat. Institute | 74/740 |
| 50-155868A | 12/1975 | Japan | |
| 54-145859A | 11/1979 | Japan | |
| 57-179460A | 11/1982 | Japan | |
| 59-117943A | 7/1984 | Japan | |
| 61-27341A | 2/1985 | Japan | |
| 60-65943 | 4/1985 | Japan | 74/762 |
| 61-55451A | 3/1986 | Japan | |
| 61-55454A | 3/1986 | Japan | |
| 61-104854 | 7/1986 | Japan | |
| 61-117953 | 7/1986 | Japan | |
| 62-2052A | 1/1987 | Japan | |
| 62-215148 | 8/1987 | Japan | |
| 63-69840 | 3/1988 | Japan | |
| WO85/05666 | 12/1985 | PCT Int'l Appl. | |
| 2103736 | 2/1983 | United Kingdom | 74/769 |

OTHER PUBLICATIONS

Service Manual of Automatic Transaxle of RN4F02A Type, RL4F02A Type (A261C06), Nissan Motor Company Ltd., 1984, p. 10.

*Primary Examiner*—Dwight Diehl
*Assistant Examiner*—Chris Campbell
*Attorney, Agent, or Firm*—Foley & Lardner, Schwartz, Jeffery, Schwaab, Mack, Blumenthal & Evans

[57] ABSTRACT

A planetary gearing for an automatic transmission comprises a main and auxiliary planetary gearings which are operatively coupled with each other. The auxiliary planetary gearing has a reduction drive state and a direct drive state and it shifts from the reduction drive state thereof to the direct drive state thereof when the main planetary gearing state has shifted up to the n−1 speed state thereof, where n is an integer not less than four. The main planetary gearing has n forward speeds.

9 Claims, 4 Drawing Sheets

| SPEED | OVERALL TRANSMISSION | | | MAIN PLANETARY GEARING | | | | | | | AUXILIARY PLANETARY GEARING | | | |
|---|---|---|---|---|---|---|---|---|---|---|---|---|---|---|
| | SPEED RATIO | SPEED RATIO | RATIO BETWEEN SPEEDS | STATE | R/C | H/C | L/C | B/B | LR/B | OWC 1 | STATE | D/C | RD/B | OWC 2 |
| 1 | $\frac{(1+\alpha_2)(1+\alpha_3)}{\alpha_2}$ | 4.67 | 1.91 | 1 | | ○ | | ○ | ○ | | REDUCTION | | ○ | ○ |
| 2 | $\frac{\alpha_1 \cdot \alpha_2 + \alpha_1 + \alpha_2}{\alpha_2(\alpha_1+1)}(1+\alpha_3)$ | 2.45 | 1.68 | 2 | | | ○ | ○ | | | REDUCTION | | ○ | ○ |
| 3 | $1+\alpha_3$ | 1.45 | 1.45 | 3 (DIRECT) | | ○ | ○ | | | | REDUCTION | | ○ | ○ |
| 4 | 1 | 1.00 | 1.45 | 3 (DIRECT) | | ○ | ○ | | | | DIRECT | ○ | | |
| 5 | $\frac{1}{1+\alpha_1}$ | 0.69 | | 4 | | ○ | | | ○ | | DIRECT | ○ | | |
| REV. | $-\frac{\alpha_3+1}{\alpha_1}$ | −0.32 | | REV. | ○ | | | | ○ | | REDUCTION | | ○ | ○ |

FIG.1A

| SPEED | OVERALL TRANSMISSION | | | MAIN PLANETARY GEARING | | | | | | | AUXILIARY PLANETARY GEARING | | | |
|---|---|---|---|---|---|---|---|---|---|---|---|---|---|---|
| | SPEED RATIO | SPEED RATIO | RATIO BETWEEN SPEEDS | STATE | R/C | H/C | L/C | B/B | LR/B | OWC 1 | STATE | D/C | RD/B | OWC 2 |
| 1 | $\dfrac{(1+\alpha_2)(1+\alpha_3)}{\alpha_2}$ | 4.67 | 1.91 | 1 | | | ○ | | ○ | ○ | REDUCTION | | | ○ |
| 2 | $\dfrac{\alpha_1 \cdot \alpha_2 + \alpha_1 + \alpha_2}{\alpha_2(\alpha_1+1)}(1+\alpha_3)$ | 2.45 | 1.68 | 2 | | | ○ | ○ | | | REDUCTION | | ○ | ○ |
| 3 | $1+\alpha_3$ | 1.45 | 1.45 | 3 (DIRECT) | | ○ | ○ | | | | REDUCTION | | ○ | ○ |
| 4 | $1$ | 1.00 | 1.45 | 3 (DIRECT) | | ○ | | ○ | | | DIRECT | ○ | | |
| 5 | $\dfrac{1}{1+\alpha_1}$ | 0.69 | | 4 | | ○ | | ○ | | | DIRECT | ○ | | |
| REV. | $-\dfrac{\alpha_3+1}{\alpha_1}$ | −0.32 | | REV. | ○ | | | | ○ | | REDUCTION | | ○ | ○ |

FIG.2A

| OVERALL TRANSMISSION | | | MAIN PLANETARY GEARING | | AUXILIARY PLANETARY GEARING |
|---|---|---|---|---|---|
| GEAR | GEAR RATIO | RATIO BETWEEN GEARS | GEAR | GEAR RATIO | STATE |
| 1 | 4.67 | 1.91 | 1 | 3.222 | REDUCTION |
| 2 | 2.45 | 1.68 | 2 | 1.69 | REDUCTION |
| 3 | 1.45 | 1.45 | 3 | 1 | REDUCTION |
| 4 | 1 | | 3 | 1 | DIRECT |

FIG.4

| OVERALL TRANSMISSION | | | MAIN PLANETARY GEARING | | AUXILIARY PLANETARY GEARING |
|---|---|---|---|---|---|
| SPEED | SPEED RATIO | RATIO BETWEEN SPEEDS | STATE | SPEED RATIO | STATE |
| 1 | 4.67 | 1.91 | 1 | 3.222 | REDUCTION |
| 2 | 2.45 | 1.68 | 2 | 1.69 | REDUCTION |
| 3 | 1.45 | 1.45 | 3 | 1 | REDUCTION |
| 4 | 1.01 | 1.45 | 4 | 0.69 | REDUCTION |
| 5 | 0.69 | 1.41 | 4 | 0.69 | DIRECT |
| 6 | 0.49 | | 5 | 0.49 | DIRECT |

PLANETARY GEARING FOR AUTOMATIC TRANSMISSION

BACKGROUND OF THE INVENTION

The present invention relates to a planetary gearing for an automatic transmission, and more particularly to a speed multiplication technique of a planetary gearing.

There have been known two approaches to a speed multiplication of a planetary gearing for an automatic transmission which provides at least three forward speeds and one reverse speed. One approach which is disclosed in JP 59-117943 A is to add an auxiliary planetary gearing to a planetary gearing which has four forward speeds with an overdrive as the fourth speed. The auxiliary planetary gearing serves as an overdrive mechanism when the main planetary gearing is in the fourth speed to provide another overdrive as a new fifth speed.

Another approach is disclosed in JP 50-155868 A. According to this known patent specification, an auxiliary planetary gearing is added to a planetary gearing which has three forward speeds with a direct drive as the third speed. The auxiliary planetary gearing serves as a reduction mechanism when the main planetary gearing is shiftable among the first, second and third speeds, while it shifts to a direct drive state thereof when the main planetary gearing is in the third speed. This results in providing new first to third speeds which have speed ratios larger than those of the first to third speeds which were provided by the main planetary gearing alone.

Let it be considered that the second approach is applied to a planetary gearing which has four forward speeds with an overdrive as the fourth speed. Applying this approach to the planetary gearing of the abovementioned type results in addition of an auxiliary planetary gearing in such a manner that the auxiliary planetary gearing serves as a reduction mechanism when the main planetary gearing is in any one of the first to fourth speeds, while it is locked when the main planetary gearing is in the fourth speed. In the main planetary gearing, there is at least one rotary member which rotates at an increased speed relative to a revolution speed of an input shaft during the overdrive state. The first to fourth speeds are frequently used in the overall planetary gearing. This causes an increase in the frequency at which the main planetary gearing is in its overdrive state where some rotary members of the main planetary gearing rotate at the increased speed relative to the revolution speed of the input shaft. This results in increased friction loss of bearings supporting the rotary member. Thus, the endurability of the bearings have to be improved.

An object of the present invention is to provide a speed multiplication technique of a planetary gearing which has n (n: an integer not less than four) forward speeds such that the first or lowest speed of the overall planetary gearing has a speed ratio larger than a speed ratio of the first speed provided by the main planetary gearing alone.

A specific object of the present invention is to provide a planetary gearing for an automatic transmission, which planetary gearing provides n+1 speeds (n: an integer not less than four) and includes a main planetary gearing having n speeds and an auxiliary planetary gearing operatively coupled with the main planetary gearing such that the lowest or first speed of the overall planetary gearing has a speed ratio larger than a speed ratio provided by the first speed of the main planetary gearing alone, and a ratio between a speed ratio of any one forward speed and a speed ratio of the next adjacent higher another forward speed is not greater than a ratio between the speed ratio of the another forward speed and a speed ratio of the next adjacent higher forward speed.

SUMMARY OF THE INVENTION

According to the present invention, there is provided a planetary gearing for an automatic transmission, which comprises:
a main planetary gearing which has n forward speed states, where n is an integer not less than four; and
an auxiliary planetary gearing operatively coupled with said main planetary gearing, said auxiliary planetary gearing having a reduction drive state and a direct drive state,
wherein said auxiliary planetary gearing shifts from the reduction drive state thereof to the direct drive state thereof when said main planetary gearing has shifted up to a predetermined forward speed state among said n forward speed states.

BRIEF DESCRIPTION OF THE DRAWINGS

FIGS. 1A is a table illustrating friction elements which are activated for establishing each of n+1 speeds (n: four in this embodiment) and a ratio between a gear ratio of one speed and a gear ratio of the next adjacent higher speed;

FIG. 4 is a similar table to FIG. 1A but for a modification of the third embodiment.

DETAILED DESCRIPTION OF THE INVENTION

Figure 1:
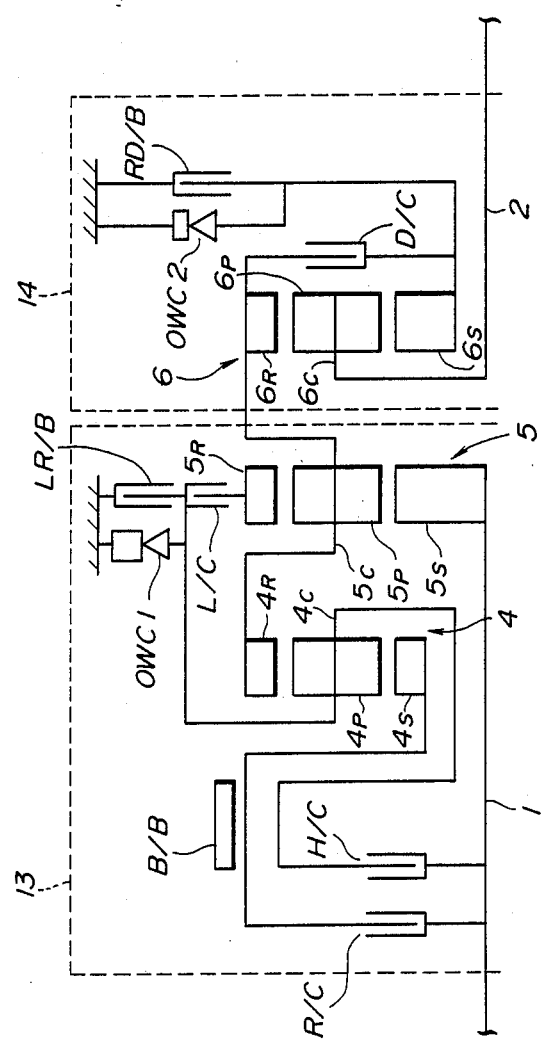
FIG. 1 is a schematic diagram of a first embodiment of a planetary gearing according to the present invention.

Referring to FIG. 1, there is shown a planetary gearing having an input shaft 1 and an output shaft 2. The input and output shafts 1 and 2 are arranged in opposed and alignment relationship. A main planetary gearing generally designated by a reference numeral 13 is concentrically arranged with respect to the input shaft, while an auxiliary planetary gearing generally designated by a reference numeral 14 is concentrically arranged with respect to the output shaft 2.

The main planetary gearing used in this embodiment is of the same type as one disclosed in page 10 of "SERVICE MANUAL OF AUTOMATIC TRANSAXLE OF RN4F02A TYPE, RL4F02A TYPE" (A261C06) published by NISSAN MOTOR COMPANY LIMITED in 1984. Briefly describing, the main planetary gearing 13 comprises a tandem arrangement of two simple planetary gear sets 4 and 5. The planetary gear set 4 includes a sun gear $4_S$, a ring gear $4_R$, pinions $4_P$ each meshing both with the sun and ring gears $4_S$ and $4_R$, and a carrier $4_C$ rotatably supporting the pinions $4_P$. Similarly, the planetary gear set 5 includes a sun gear $5_S$, a ring gear $5_R$, pinions $5_P$ each meshing both with the sun and ring gears $5_S$ and $5_R$, and a carrier $5_C$ rotatably supporting the pinions $5_P$.

The sun gear $4_S$ is adapted to be held stationary by a band brake B/B, and it is connectable with the input shaft 1 by a reverse clutch R/C. The carrier $4_C$ is connectable with the input shaft 1 by a high clutch H/C. A one-way clutch OWC1 is provided to prevent the carrier $4_C$ from rotating in a direction opposite to a direction which the input shaft 1 rotates in. Besides, the carrier $4_C$ is adapted to be held stationary by a reverse brake LR/B.

The sun gear $5_S$ is connected with the input shaft 1, the carrier $5_C$ is connected with the ring gear $4_R$ and the ring gear $5_R$ is connectable with the carrier $4_C$ by a low clutch L/C.

The auxiliary planetary gearing 14 comprises a simple planetary gear set 6 which includes a sun gear $6_S$, a ring gear $6_R$, pinion $6_P$ each meshing both with the sun gear $6_S$ and ring gear $6_R$, and a carrier $6_P$ rotatably supporting the pinions $6_P$. The carrier $5_C$ serves as an output member of the main planetary gearing 13. The ring gear $6_R$ of the auxiliary planetary gearing 14 is connected with this carrier $5_C$ of the main planetary gearing 13. The carrier $6_C$ is connected with the output shaft 2. The ring gear $6_R$ is connectable with the sun gear $6_S$ by a direct clutch D/C. Rotation of the sun gear $6_S$ in a direction opposite to the direction of rotation of the input shaft 1 is prevented by a one-way clutch OWC2. This sun gear $6_S$ is adapted to be held stationary by a reduction brake RD/B.

This embodiment of the overall planetary gearing can establish desired one of the first to fifth speeds by activating such selected one or ones of the clutches and brakes as indicated by reference characters as shown in FIG. 1A.

In order to make full understanding of the overall planetary gearing, the operation of the main planetary gearing 13 is now described. Referring also to FIG. 1A, when the low clutch L/C is engaged, the ring gear $5_R$ is connected to the inner race of the one-way clutch OWC1 so that the ring gear $5_R$ is now prevented from rotating in a direction opposite to the direction of rotation of the input shaft 1. Thus, in this case, a rotation of the input shaft 1 transmitted to the sun gear $5_S$ causes the carrier $5_C$ to rotate in the same direction as the direction of rotation of the input shaft 1 at a reduced speed. Under this condition, the speed ratio between the input shaft 1 and the carrier $5_C$ can be expressed by a formula $(1+\alpha_2)/\alpha_2$ if a gear ratio between the sun gear $5_C$ and ring gear $5_R$ is expressed by $\alpha_2$ (alpha two). If the carrier $5_C$ is subject to a torque in the direction opposite to the direction of rotation of the input shaft 1, the low reverse brake LR/B is enagaged to hold the ring gear $5_R$ stationary bypassing the one-way clutch OWC1. This condition is referred to as the first speed state of the main planetary gearing 13.

When the band brake B/B is engaged with the low clutch L/C kept engaged, the band brake B/B holds the sun gear $4_S$ stationary to render same to work as a reaction member. This causes the carrier $5_C$ to rotate in the same direction but at a less reduced speed. Under this condition, the speed ratio between the input shaft 1 and carrier $5_C$ can be expressed by a formula $(\alpha_1 \cdot \alpha_2 + \alpha_1 + \alpha_2)/\{\alpha_2(1+\alpha_1)\}$ if a gear ratio between the sun gear $4_S$ and ring gear $4_R$ is expressed by $\alpha_1$ (alpha one). This condition is referred to as the second speed state of the main planetary gearing 13.

When the high clutch H/C is engaged with the band brake B/B released and the low clutch L/C kept engaged, rotation of the input shaft 1 is transmitted also to the ring gear $5_R$, causing same to rotate at the same speed as the input shaft 1. Since both the ring gear $5_R$ and sun gear $5_S$ rotate at the same speed, the carrier $5_C$ also rotates at the same speed. Under this condition, both of the planetary gear sets 4 and 5 rotate in unison with the input shaft 1 so that a direct drive between the input shaft 1 and carrier $5_C$ is established. This condition is referred to as the third speed state (direct drive) of the main planetary gearing 13.

When the band brake B/B is engaged with the low clutch L/C released and the high clutch H/C kept engaged, the band brake B/B holds the sun gear $4_S$ stationary to render same to work as a reaction member. Rotation of the input shaft 1 is now transmitted to the carrier $4_C$ and causes the ring gear 4R and thus the carrier $5_C$ to rotate at an increased speed ratio since the sun gear $4_S$ is held stationary. This speed ratio can be expressed by a formula $1/(1+\alpha_1)$. This condition is referred to as the fourth speed state (overdrive) of the main planetary gearing 13.

When the reverse clutch R/C and low reverse brake LR/B only are engaged, rotation of the input shaft 1 transmitted to the sun gear $4_S$ causes the ring gear $4_R$ and thus the carrier $5_C$ to rotate in the opposite direction at a reduced speed since the low reverse brake LR/B holds the carrier $4_C$ stationary. This reduction ratio can be expressed by a formula $-1/\alpha_1$. This condition is referred as a reverse state of the main planetary gearing 13.

Hereinafter, the operation of the auxiliary planetary gearing 14 is described. When the reduction brake RD/B is engaged, the sun gear $6_S$ is held stationary so that rotation of the carrier $5_C$ transmitted to the ring gear $6_R$ causes the carrier $6_C$ and thus the output shaft 2 to rotate at a reduced speed. The speed ratio between the carrier $5_C$ and output shaft 2 can be expressed by a formula $1+\alpha_3$ if a gear ratio between the sun gear $6_S$ and ring gear $6_R$ is expressed by $\alpha_3$ (alpha three).

When the direct clutch D/C is engaged with the reduction brake RD/B released, the direct drive state where the rotation of the carrier $5_C$ is directly transmitted to the output shaft 2 is established.

If the sun gear $6_S$ rotates in a direction opposite to the direction of rotation of the carrier $5_C$ and ring gear $6_R$ after release of the reduction brake RD/B but before engagement of the direct clutch D/C, there occurs a great shock during engagement of the direct clutch D/C. However, the occurrence of such shock is prevented by the one-way clutch OWC2 which prevents the sun gear $6_S$ from rotating in the direction opposite to the direction of rotation of the ring gear $6_R$.

Considering now the overall planetary gearing comprising the main and auxiliary planetary gearings 13 and 14, the first speed with a speed ratio expressed as $\{(1+\alpha_2)(1+\alpha_3)\}/\alpha_2$ is established when the main planetary gearing 13 is in the first speed state thereof with the auxiliary planetary gearing 14 in its reduction drive state. The second speed with a speed ratio expressed as $(\alpha_1 \cdot \alpha_2 + \alpha_1 + \alpha_2)(1+\alpha_3)/\{\alpha_2(\alpha_1+1)\}$ is established when the main planetary gearing 13 upshifts to the second speed state thereof with the auxiliary planetary gearing held in its reduction drive state. The third speed with a speed ratio expressed as $1+\alpha_3$ is established when the main planetary gearing 13 upshifts to the third speed state (direct drive state) thereof with the auxiliary planetary gearing 14 held in its reduction drive state. The fourth speed (direct drive) is established when with the main planetary gearing 13 held in its third speed state theeof the auxiliary planetary gearing 14 shifts to its direct drive state. The fifth speed with a speed ratio expressed as $1/(1+\alpha_1)$ is established when the main planetary gearing 13 upshifts to the fourth speed state thereof with the auxiliary planetary gearing 14 held in its direct drive state. The reverse with a speed ratio expressed as $-(\alpha_3+1)/\alpha_1$ is established when the main planetary gearing 13 shifts to the reverse drive state thereof with the auxiliary planetary gearing 14 held in the reduction drive state thereof.

The examples of the speed ratios shown in FIG. 1A have been calculated on the assumption that the gear ratios $\alpha_1=\alpha_2=\alpha_3=0.45$. The gear ratios may be common value or different values as long as such value or values fall in a preferrable range from 0.4 to 0.6.

A ratio between the speed ratio of the first speed and that of the second speed is 4.69/2.45 which is about 1.91. A ratio between the speed ratio of the second speed and that of the third speed is 2.45/1.45 which is about 1.68. A ratio between the speed ratio of the third speed and that of the fourth speed is 1.45/1.00 which is 1.45. A ratio between the speed ratio of the fourth speed and that of the fifth speed is 1.00/0.69 which is about 1.45. In the ratio between the speed ratio of any one forward speed and that of the next adjacent higher speed decreases on the higher speed side. More precisely, a ratio between a speed ratio of any one forward speed and a speed ratio of the next adjacent higher another forward speed is not greater than a ratio between the speed ratio of the another forward speed and a speed ratio of the next adjacent higher forward speed. This relationship must hold to maintain good driveability of the vehicle.

Although in the previously described embodiment the direct clutch D/C is operatively disposed between the ring gear $6_R$ and the sun gear $6_S$, the arrangement of the direct clutch D/C is not limited to this example. The direct clutch D/C may be disposed as shown in FIG. 2 or FIG. 3.

Figure 2:
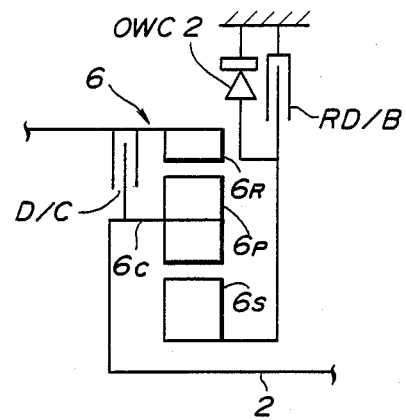
FIG. 2 is a schematic fragmentary diagram of a second embodiment of the auxiliary a planetary gearing according to the present invention.

FIG. 2 shows a second embodiment which is different from the first embodiment only in that a direct clutch D/C is operatively disposed between a ring gear $6_R$ and carrier $6_C$.

Figure 3:
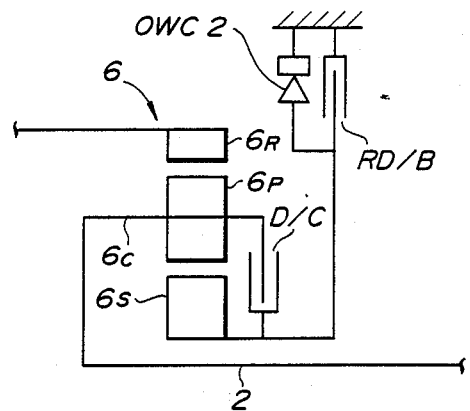
FIG. 3 is a schematic fragmentary diagram of a third embodiment of the auxiliary planetary gearing according to the present invention.

FIG. 3 shows a third embodiment which is different from the first embodiment only in that a direct clutch D/C is operatively disposed between a carrier $6_C$ and a sun gear $6_S$.

FIG. 4 shows a table when an auxiliary planetary gearing should shift from the reductiuon drive state to the direct drive state thereof in the case where the auxiliary planetary gearing is applied to an existing planetary gearing (i.e., a main planetary gearing) having two overdrives as the fourth and fifth speed states thereof. As will be readily understood from FIG. 4, the auxiliary planetary gearing shifts from the reduction drive state thereof to the diret drive state when the main planetary gearing in in the fourth speed state thereof. Therefore, it will be recognized that the auxiliary planetary gearing shifts from the reduction drive state thereof to the direct drive state thereof when the main planetary gearing state is in the n−1 speed if the main planetary gearing has n speed states (n: an integer not less than four).

What is claimed is:

1. A planetary gearing for an automatic transmission, comprising:

a main planetary gearing which has n forward speed states, where n is an integer not less than four, said main planetary gearing including an input shaft and a single output member; and an auxiliary planetary gearing including an output shaft and a single input member rotatable with said output member of said main planetary gearing, said auxiliary planetary gearing being shiftable between a reduction drive state where a predetermined reduction ratio is established between said input member and said output shaft and a direct drive state where said auxiliary planetary gearing is locked to rotate as a unit to establish the direct drive between said input member and said output shaft;

wherein, when said main planetary gearing is in any forward speed state among said n forward speed states, said auxiliary planetary gearing is conditioned in said reduction drive state, while said auxiliary planetary gearing shifts from said reduction drive state thereof to said direct drive state thereof after said main planetary gearing has shifted up to said predetermined forward speed state;

wherein said main planetary gearing is shiftable up to an n−1 forward speed state with said auxiliary planetary gearing kept in said reduction drive state thereof, said auxiliary planetary gearing shifts from said reduction drive state thereof to said direct drive state thereof when said main planetary gearing is in said direct drive state thereof when said main planetary gearing shifts up to an n forward speed state thereof.

2. A planetary gearing for an automatic transmission, comprising:

a main planetary gearing which has n forward speed states, where n is an integer not less than four, said main planetary gearing including an input shaft and a single output member; and an auxiliary planetary gearing including an output shaft and a single input member rotatable with said output member of said main planetary gearing, said auxiliary planetary gearing being shiftable between a reduction drive state where a predetermined reduction ratio is established between said input member and said output shaft and a direct drive state where said auxiliary planetary gearing is locked to rotate as a unit to establish the direct drive between said input member and said output shaft;

wherein, when said main planetary gearing is in any forward speed state among said n forward speed states lower than a predetermined forward speed state, said auxiliary planetary gearing is conditioned in said reduction drive state, while said auxiliary planetary gearing shifts from said reduction drive state thereof to said direct drive state thereof after said main planetary gearing has shifted up to said predetermined forward speed state;

wherein said main planetary gearing provides an overdrive as an n speed state thereof;

wherein said predetermined forward speed state is a third forward speed state and said auxiliary planetary gearing shifts between said reduction drive state thereof and said direct drive state thereof when said main planetary gearing is in any one speed state thereof not lower than said third forward speed state thereof.

3. A planetary gearing as claimed in claim 2, wherein said auxiliary planetary gearing comprises at least one simple planetary gear set with a ring gear, a sun gear, and a carrier rotatably supporting pinions each meshing with said ring and sun gears.

4. A planetary gearing as claimed in claim 3, wherein said auxiliary planetary gearing comprises a brake means for holding said sun gear stationary and a clutch means for locking said simple planetary gear set.

5. A planetary gearing as claimed in claim 4, wherein said auxiliary planetary gearing comprises a one-way clutch means for preventing said sun gear from rotating in one direction opposite to a direction of rotation of said ring gear.

6. A planetary gearing as claimed in claim 5, wherein said clutch means is operatively disposed between said sun gear and said ring gear.

7. A plantary gearing as claimed in claim 5, wherein said clutch means is operatively disposed between said carrier and said ring gear.

8. A planetary gearing as claimed in claim 5, wherein said clutch means is operatively disposed between said sun gear and said carrier.

9. A planetary gearing for an automatic transmission, comprising:
an input shaft;
an output shaft;
a main planetary gearing having a first simple planetary gear set including a first sun gear, a first ring gear, and a first carrier carrying a first pinion meshing with said first sun and ring gears,
said main planetary gearing also having a second simple planetary gear set including a second sun gear rotatable with said input shaft, a second ring gear and an output member in the form of a second carrier which is rotatable with said first ring gear and carries a second pinion meshing with said second sun and ring gears;
said main planetary gearing also having first clutch means for connecting said first sun gear to said input shaft for rotation therewith, second clutch means for connecting said first carrier to said input shaft for rotation therewith, third clutch means for connecting said first carrier to said second ring gear for rotation therewith;
said main planetary gearing also having first one-way clutch means for preventing rotation of said first carrier in one direction, and first brake means for holding said first carrier stationary;
an auxiliary planetary gearing having a third simple planetary gear set including a third sun gear, an input member in the form of a third carrier rotatable with said output shaft and carrying a third pinion meshing with said third sun and ring gears,
said auxiliary planetary gearing having direct clutch means for locking said third planetary gear set for rotation as a unit, second one-way clutch means for preventing rotation of said third sun gear in one direction, and second brake means for holding said third sun gear stationary.

* * * * *